United States Patent
Takae et al.

(10) Patent No.: US 7,174,160 B2
(45) Date of Patent: Feb. 6, 2007

(54) MOBILE DEVICE CONTROLLING METHOD, IC CARD UNAUTHORIZED USE PREVENTING METHOD, PROGRAM FOR CHANGING SETTINGS OF MOBILE DEVICE, AND PROGRAM FOR PREVENTING IC CARD FROM UNAUTHORIZED USE

(75) Inventors: Naohito Takae, deceased, late of Suginami (JP); by Yumiko Takae, legal representative, Suginami (JP); Hiroyuki Tani, Sapporo (JP); Hiroyuki Omiya, Aomori (JP)

(73) Assignee: Fujitsu Limited, Kawasaki (JP)

( * ) Notice: Subject to any disclaimer, the term of this patent is extended or adjusted under 35 U.S.C. 154(b) by 164 days.

(21) Appl. No.: 10/644,065

(22) Filed: Aug. 20, 2003

(65) Prior Publication Data

US 2004/0087337 A1 May 6, 2004

Related U.S. Application Data

(63) Continuation of application No. PCT/JP01/09444, filed on Oct. 26, 2001.

(30) Foreign Application Priority Data

Mar. 1, 2001 (JP) .............................. 2001-057312

(51) Int. Cl.
 *H04M 3/16* (2006.01)
(52) U.S. Cl. ...................... 455/411; 455/558; 455/410; 455/407

(58) Field of Classification Search ................ 455/410, 455/411, 558, 425, 406, 407; 235/492, 380
See application file for complete search history.

(56) References Cited

U.S. PATENT DOCUMENTS 6,092,133 A * 7/2000 Erola et al. .................. 710/301
6,669,487 B1 * 12/2003 Nishizawa et al. ........... 439/60

FOREIGN PATENT DOCUMENTS

JP  8-251660  9/1996

(Continued)

OTHER PUBLICATIONS

Japanese Office Action mailed Nov. 8, 2005 for Japanese Patent Application No. 2001-057312.

(Continued)

*Primary Examiner*—Joseph Feild
*Assistant Examiner*—David Q. Nguyen
(74) *Attorney, Agent, or Firm*—Staas & Halsey LLP

(57) ABSTRACT

The present invention is related to a mobile device controlling method for changing a setting of a mobile device capable of mounting a SIM card and an IC card for settlement. According to the present invention, a step (ST1) receiving and confirming an application for a setting change of the mobile device, an e-mail address specifying step (ST4) specifying an e-mail address of the mobile device, and an e-mail creating step (ST5) creating a setting change e-mail are conducted. Then, the setting change e-mail created in the e-mail creating step is sent to the e-mail address specified in said e-mail address specifying step.

2 Claims, 7 Drawing Sheets

MOBILE DEVICE — NUMBER

SIM CARD — SUBSCRIBER ID NUMBER

IC CARD FOR SETTLEMENT — · CREDIT NUMBER
(CUSTOMER NUMBER)
· APPLICATION MANAGEMENT NUMBER

FOREIGN PATENT DOCUMENTS

| | | |
|---|---|---|
| JP | 9-182158 | 7/1997 |
| JP | 09-200668 | 7/1997 |
| JP | 10-27206 | 1/1998 |
| JP | 11-85920 | 3/1999 |
| JP | 11-177682 | 7/1999 |
| JP | 2000-270376 | 9/2000 |
| JP | 2000-307724 | 11/2000 |
| JP | 2001-034716 | 2/2001 |
| WO | WO9701253 * | 1/1997 |

OTHER PUBLICATIONS

Japanese Office Action dated Feb. 7, 2006 of Application No. 2001-057312.

Nagaoka, Jiro, et al., "PC Card + IC Card Keitsi Jouhou Tool ni Security Kinou ha Fukaketsu", *Mobile Media Magazine*, C.media Co., Ltd., Feb. 1994, vol. 2, pp. 106-110.

* cited by examiner

FIG.2

| MOBILE DEVICE | | NUMBER |

SIM CARD ———————— SUBSCRIBER ID NUMBER

IC CARD FOR ———— · CREDIT NUMBER
SETTLEMENT              (CUSTOMER NUMBER)

· APPLICATION
  MANAGEMENT NUMBER

FIG.6A

USER AUTHENTICATION INFORMATION

| No. | CREDIT NUMBER (CUSTOMER NUMBER) | NAME |
|---|---|---|
| 1 | AAAABBBBCCCC0001 | AOMORI, TARO |
| 2 | AAAABBBBCCCC0002 | AOMORI, JIRO |

FIG.6B

APPLICATION MANAGEMENT INFORMATION

| No. | APPLICATION MANAGEMENT NUMBER | CREDIT NUMBER (CUSTOMER NUMBER) | USE STATE IDENTIFICATION | SUBSCRIBER ID |
|---|---|---|---|---|
| 1 | XXXXX1 | AAAABBBBCCCC0001 | AVAILABLE | 1111 |
| 2 | XXXXX2 | AAAABBBBCCCC0002 | STOP | 2222 |

FIG.6C

APPLICATION MANAGEMENT INFORMATION

| No. | SETTING CHANGE IDENTIFICATION | INSTRUCTION PART (SETTING CHANGE COMMAND STATEMENT) |
|---|---|---|
| 1 | XXX1 | MAIN PART OF MOBILE PHONE LOCK INSTRUCTION |
| 2 | XXX2 | SIM LOCK INSTRUCTION |
| 3 | XXX3 | MAIN PART OF MOBILE PHONE AND SIM LOCK INSTRUCTION |

FIG.6D

MOBILE PHONE MANAGEMENT INFORMATION

| No. | SUBSCRIBER ID | TELEPHONE NUMBER | E-MAIL ADDRESS |
|---|---|---|---|
| 1 | 1111111111 | XXXXXXXX0001 | aaa@111.co.jp |
| 2 | 2222222222 | XXXXXXXX0002 | bbb@222.co.jp |
| 3 | 3333333333 | XXXXXXXX0003 | ccc@333.co.jp |

MOBILE DEVICE CONTROLLING METHOD, IC CARD UNAUTHORIZED USE PREVENTING METHOD, PROGRAM FOR CHANGING SETTINGS OF MOBILE DEVICE, AND PROGRAM FOR PREVENTING IC CARD FROM UNAUTHORIZED USE

This application is a continuing application, filed under 35 U.S.C. §111(a), of International Application PCT/JP01/09444, filed Oct. 26, 2001, it being further noted that foreign priority benefit is based upon Japanese Patent Application 2001-057312, filed Mar. 1, 2001.

TECHNICAL FIELD

The present invention relates to a mobile device controlling method, an IC card unauthorized use preventing method, a program for changing settings of a mobile device, and a program for preventing an IC card from unauthorized use.

BACKGROUND ART

Use of a mobile phone is changing from a state in that the mobile phone was conventionally mainly used for conversation, to a state in that the mobile phone is additionally used to utilize the Internet. Accompanied with this change, the mobile phone has been used more frequently to make a payment such as a browsing fee for use of charged contents, an Internet shopping payment, or a like other than a telephone bill. Generally, the mobile phone is used as a payment method for a charge or a cost, a settlement method such as a transfer or an automatic transfer. Other than these settlement method, a settlement method using an IC (Integrated Circuit) card is practically used.

Moreover, needs of the mobile phone are also diversified. In order to correspond to the diversified needs, the mobile phone that conducts communication and settlement is spreading, in which a main part of the mobile phone is mounted with a SIM (Subscriber Identity Module) card or the IC card for settlement.

A SIM card is used as the IC card for communication and is used by inserting into a mobile device (the mobile phone, a mobile terminal, or a like). Information (subscriber ID or a like) of a user of the mobile device and information of speed dials and a telephone book are stored. Since the subscriber ID is written in the SIM card, communication can be conducted from any mobile device by inserting the SIM card if the mobile device supports the SIM card.

The subscriber ID is a number to the SIM card in that number is given by a mobile communication entrepreneur when a user applies for service provided from the mobile communication entrepreneur and is registered. This subscriber ID is stored in the SIM card, and is automatically transmitted when the communication is conducted via the SIM card.

The IC card for settlement is an IC card that is used by inserting into the mobile phone. A credit number is stored in this IC card. Alternatively, an IC card storing cybermoney may be used.

This mobile phone has advantages in that the entire mobile phone is not necessary to be replaced with another mobile phone but only a main part of the mobile phone is replaced with that of another mobile phone when the user buys another mobile phone to replace, and then the same SIM card can be continuously used. In addition, even if he mobile phone possessed by the user is not available to use due to a problem such as being out of order or out of battery supply, it is possible for the user to communicate by inserting the SIM card into another mobile phone.

Moreover, since the IC card for settlement is embodied in the mobile phone, various payments can be conducted by using the mobile phone. Furthermore, if the IC card stores the cybermoney, an immediate settlement can be realized in a case of making a payment for the browsing fee for use of charged contents and for Internet shopping.

Problems occur in a case of loss or a theft of the mobile phone mounting the above-described SIM card and IC card for settlement. That is, when a third person communicates by using the mobile phone, an original owner who is used to possess the mobile phone is charged for this communication fee. Similarly, the third person used the mobile phone and made a payment, the nominee of the IC card for settlement is charged for this payment.

In order to manage problems described above, the original owner of the mobile phone is required to make communication with a telephone number registered in the SIM card impossible, so as for the SIM card that is lost or stolen not to be used. That is, the original owner reports the telephone number registered to the SIM card to the mobile phone entrepreneur. By this report, a setting of a switching device is changed, so that it becomes impossible to communicate by using the SIM card.

Even if it is impossible to communicate by using the SIM card of the mobile phone that is lost or stolen, it is still possible to communicate by inserting another SIM card possessed by the third person to the mobile phone that is lost or stolen. In this case, since the third person who made communication is charged, there is not problem with respect to this charge.

Moreover, in order not to limit use of the IC card of the mobile telephone that is lost or stolen, a setting of the mobile telephone should be changed. However, conventionally in a case in which the SIM card possessed by the third person is inserted into the mobile phone that is lost or stolen and a payment is made by using the IC card inserted into the mobile phone that is lost or stolen, since the mobile phone that is lost or stolen cannot be specified, it is impossible to change a setting of the mobile phone (including the IC card for settlement and the SIM card).

Considering the above-problems, an object of the present invention is to simplify a setting change of the mobile phone.

DISCLOSURE OF INVENTION

It is a general object of the present invention is to simplify a setting change of the mobile phone.

In order to achieve this object, the present invention applies parts including that the following characteristics.

The present invention includes a receiving step (for example, ST1 in FIG.3) receiving an application for a setting change of the mobile device; an e-mail address specifying step (for example ST4 in FIG.3) specifying an e-mail address of the mobile device that conducts the setting change; and an e-mail creating step (for example, ST5 in FIG.3) creating a setting change e-mail, wherein the setting change e-mail created in the e-mail creating step is sent to the e-mail address specified in the e-mail address specifying step (for example, ST6 in FIG.3), and the setting change of the mobile device is conducted, in a mobile device controlling method in a mobile device setting change center (for example, a mobile device setting change center 75 in FIG.7)

that changes a setting of a mobile device (for example, a mobile phone, a PHS (Personal Handy-phone System), a mobile terminal, or a like).

According to the present invention the mobile device setting change center receives an application for the setting change of the mobile device, and then the setting change of the mobile device is conducted. Therefore, it is possible to simplify the setting change of the mobile phone.

The present invention is characterized in that when an application management number, which is set by an IC card management center (for example, an IC card management center 71 in FIG.1) that manages IC card information in the mobile device setting change center, is registered in a memory (for example, an IC card 33 for settlement in FIG. 1) of a main part of the mobile device, the e-mail address specifying step specifies the e-mail address based on the application management number, in the mobile device controlling method.

According to the present invention, by specifying the e-mail address based on the application management number, even if the SIM card of a third person is inserted into the mobile phone that is lost or stolen and a payment is made by using the IC card being inserted into the mobile phone that is lost or stolen, it is possible to specify the mobile phone that is lost or stolen and it is possible to change the setting of the mobile phone that is lost or stolen to prevent the mobile phone from being illegally used.

The present invention includes a receiving step receiving a subscriber ID of the mobile device that conducts a setting change from an IC management center managing IC card information; a specifying step specifying a number (for example, a mobile telephone number, an e-mail address) for communication of the mobile device that conducts the setting change of the mobile device, from the subscriber ID; and a setting change step conducting the setting change of the mobile device according to the number (for example, the mobile telephone number, the e-mail address) for communication specified in the specifying step, in a setting change method for the mobile device in a mobile communication entrepreneur.

According to the present invention, the mobile communication entrepreneur can specify the number for communication of the mobile device that changes the setting of the mobile device, and can make the mobile device changed the setting thereof.

The present invention includes a step receiving e-mail sent from a mobile communication entrepreneur; a step determining whether or not a setting change identification for changing a setting of the mobile device exists in received e-mail; a step automatically opening the e-mail when the setting change identification exists; and a step changing at least one of settings of a main part of the mobile device, an IC card for communication (for example, the SIM card), and an IC card for settlement (for example, the IC card 33 for settlement in FIG.1) in accordance with an instruction in the e-mail, in a setting change method in the mobile device.

According to the present invention, when the setting change identification for changing the setting of the mobile device exists in a received e-mail, the e-mail is automatically opened and the setting of the main part of the mobile device, the IC card for communication, or the IC card for settlement can be automatically changed by changing at least one of the settings of the main part of the mobile device, the IC card for communication, or the IC card for settlement, in the mobile device.

The present invention includes a notice receiving step receiving a notice of a customer ID of an IC card from a person from whom an IC card for settlement mounted to the mobile device is lost or stolen; a step giving an identification for stopping use of the IC card to an application management number of a database, which stores the application management number that is set for each mobile device by the IC card management center so as to be a number corresponding to the customer ID; and a step informing an subscriber ID to a mobile communication entrepreneur in order to warn and change a setting for the mobile device when the IC card for settlement is used by using the mobile device for which the identification is set to the application management number, in an IC card unauthorized use preventing method in the IC card management center that manages the IC card information.

The present invention includes a receiving step receiving a subscriber ID of a mobile device that illegally uses an IC card, from an IC card management center that manages IC card information; a step specifying a communication number of the mobile device that illegally uses the IC card, based on the subscriber ID; and a warning and changing step warning and changing a setting with respect to the specified mobile device, in an IC card unauthorized use preventing method in the mobile communication entrepreneur.

The present invention includes a receiving step receiving a subscriber ID of,a mobile device that illegally uses an IC card, from an IC card management center that manages IC card information; an e-mail address specifying step specifying an e-mail address of the mobile device that illegally uses the IC card, based on the subscriber ID; and an e-mail creating step creating a setting change e-mail for changing a setting of the mobile device, wherein the setting change e-mail created in the e-mail creating step is sent to the e-mail address specified in the e-mail address specifying step, and the setting change of the mobile device is conducted, in an IC card unauthorized use preventing method.

The present invention is an invention in that the mobile device controlling method is applied to the IC card unauthorized use preventing method.

The present invention is a program for causing a computer implemented in a mobile device to change a setting of the mobile device, the program including: a step receiving e-mail sent from a mobile communication entrepreneur; a step determining whether or not a setting change identification for changing a setting of the mobile device exists in received e-mail; a step automatically opening the e-mail when the setting change identification exists; and a step changing at least one of settings of a main part of the mobile device, an IC card for communication, and an IC card for settlement in accordance with an instruction in the e-mail.

The program is a program mounted in the mobile device in the mobile device controlling method.

The present invention is a program for causing a computer to prevent an IC card from unauthorized use, the computer in an IC card management center that manages IC card information, and includes a notice receiving step receiving a notice of a customer ID of a customer from who a mobile device mounting the IC card for settlement is lost or stolen; a step giving an identification for stopping use of the IC card to an application management number of a database, which stores the application management number that is set for each mobile device by the IC card management center so as to be a number corresponding to the customer ID; and a step informing an subscriber ID to a mobile communication entrepreneur in order to warn and change a setting for the mobile device when the IC card for settlement is used by using the mobile device for which the identification is set to the application management number.

The program is a program mounted in the IC card management center in the mobile device controlling method.

BRIEF DESCRIPTION OF DRAWINGS

Other objects, features and advantages of the present invention will become more apparent from the following detailed description when read in conjunction with the accompanying drawings.

FIG. 2 is a diagram showing correspondences between a mobile device and numbers set to the mobile device.

FIG. 6A through FIG. 6D are diagrams for explaining examples of data structures for information stored in a database.

BEST MODE FOR CARRYING OUT THE INVENTION

In the following, an embodiment of the present invention will be described with reference to drawings.

Figure 1:
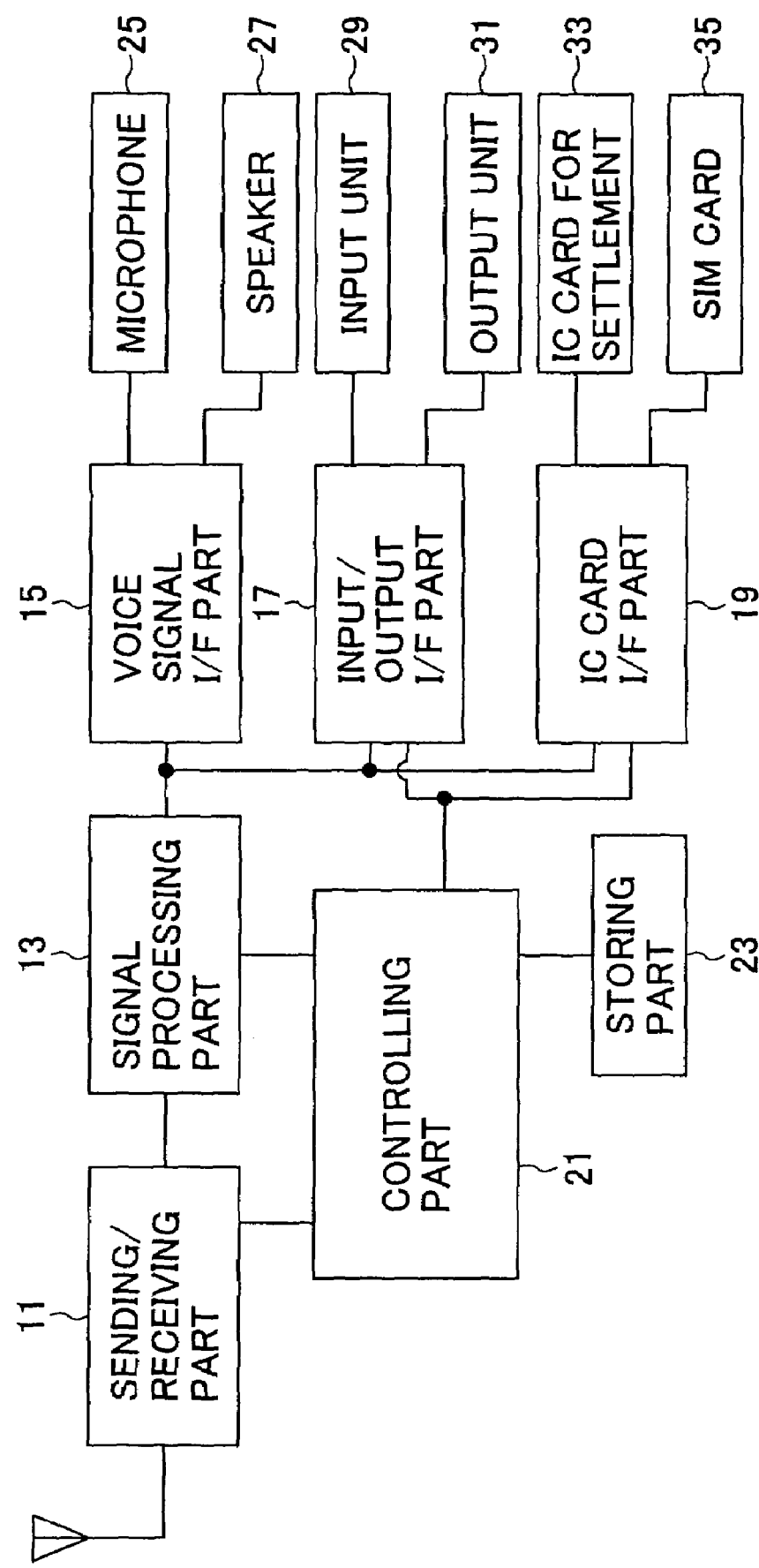
FIG. 1 is a diagram showing an example of a configuration of a mobile phone in that the present invention is implemented.

FIG.1 is a diagram showing an example of a configuration of a mobile phone in which the present invention is implemented.

The mobile phone in FIG. 1 includes a sending/receiving part 11, a signal processing part 13, a voice signal interface part 15, an input/output interface part 17, an IC card interface part 19, a controlling part 21, a storing part 23, a microphone 25, a speaker 27, an input unit 29, an output unit 31, an IC card 33 for settlement, and a SIM card 35. The sending/receiving part 11 sends and receives a signal of data or voice in the mobile phone, and includes a radio part and a baseband part. The signal processing part 13 processes a predetermined signal under control of the signal of data or voice by the controlling part 21. The voice signal interface part 15 outputs a voice signal from the speaker 27 and inputs a voice signal from the microphone 25. The input/output interface part 17 serves as an interface for input and output data. The IC card interface part 19 includes an IC card driver, and serves as an interface with the SIM card 35 and the IC card 33 for settlement. The controlling part 21 controls the sending/receiving part 11, the signal processing part 13, the voice signal interface part 15, the input/output interface part 17, the IC card interface part 19, and the storing part 23, and operates the mobile phone as a mobile phone including a predetermined function. The storing part 23 stores software for realizing a function of the IC card 33, software for utilizing the SIM card 35 and the IC card 33 for settlement, and software for changing settings of the IC card 33 for settlement and the SIM card 35. The input unit 29 inputs a signal to the controlling part 21. The output unit 31 is a display unit and displays a result processed by the signal processing part 13. For example, the IC card 33 for settlement is a credit card including an IC and is an IC card for settlement to be used by inserting into a mobile device. This IC card 33 for settlement can be supported for a specified credit company or for a plurality of credit companies. Alternatively, this IC card 33 for settlement can be an IC card such as a prepaid card storing cybermoney. Furthermore, this IC card 33 for settlement can be an IC card supporting other service. As described above, the SIM card 35 is an IC card that is used by inserting into the mobile device, and stores information (subscriber ID and a like) concerning a user of the mobile device and information of speed dials and a telephone book are stored.

FIG. 2 is a diagram showing correspondences between the mobile device and numbers set to the mobile device. An application management number is set to the IC card 33 for settlement. The application management number is a unique number defined for each application version of an IC card for each IC card when the IC card issued. For example, in a case of utilizing a plurality of IC cards, as for use of the IC card of an A credit company, a unique number is defined as the application management number with respect to a credit number of the user and the application version for the A credit company of the IC card. Similarly, as for use of the IC card of a B credit company, another unique number is defined as the application management number with respect to a credit number of the user and the application version for the B credit company of the IC card.

As described above, the application management number is given for each application version for each user for each credit company whose service is utilized.

Moreover, the IC card 33 for settlement stores the credit number. If the IC card 33 for settlement is a multi-function IC card and one function provides service in that credits of a plurality of credit companies are used by a single IC card, the IC card 33 for settlement may store a customer number set by an IC card management center that manages information concerning this IC card 33.

Figure 3:
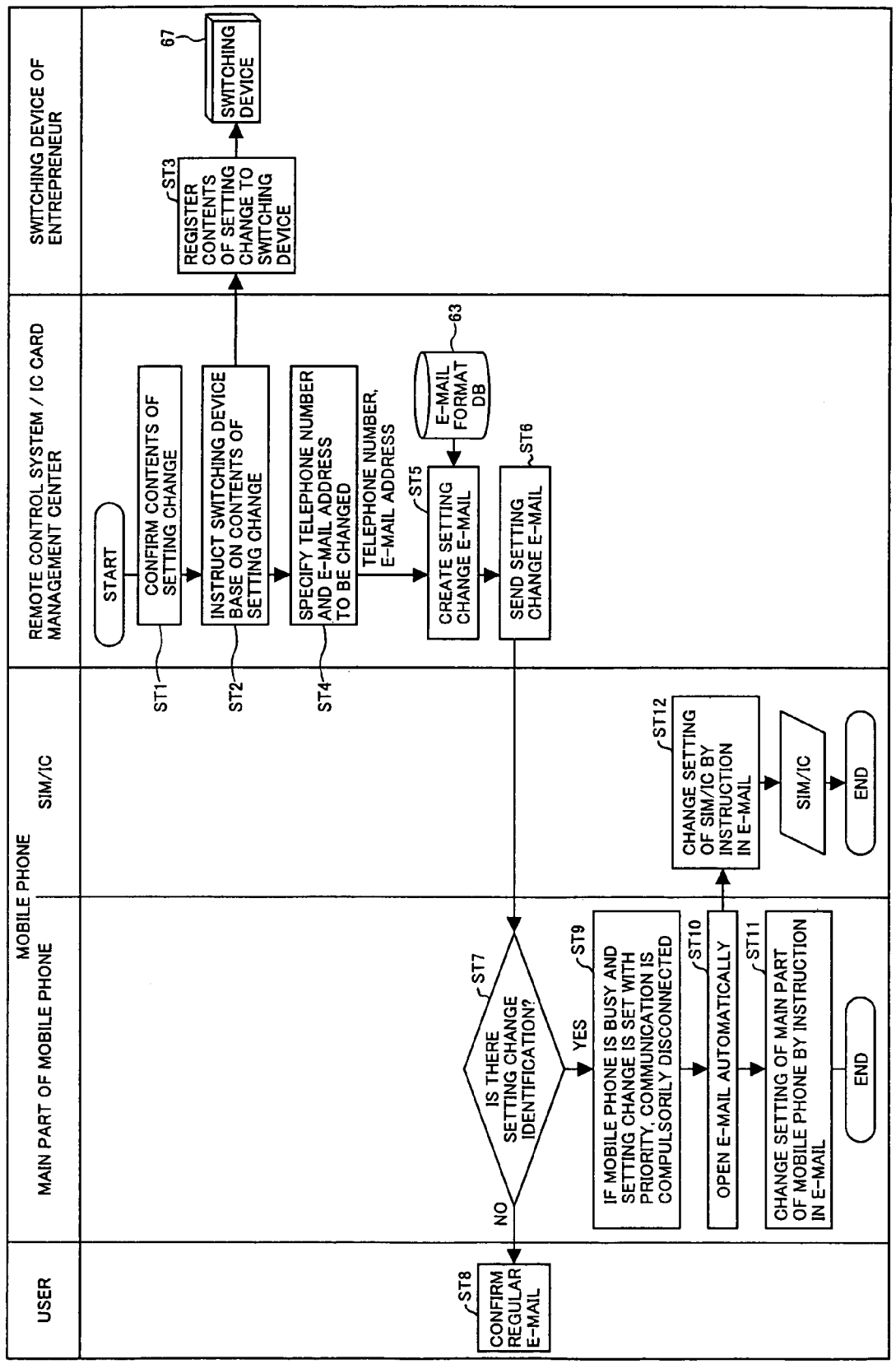
FIG. 3 is a diagram for explaining a procedure for changing settings of a SIM card, an IC card for settlement, and a main part of the mobile phone.

Referring to FIG. 3, procedures will be described in that settings of SIM card 35 and the IC card 33 for settlement or a setting of a main part of the mobile phone is changed in response to convenience of the user, a business, or a like.

Figure 7:
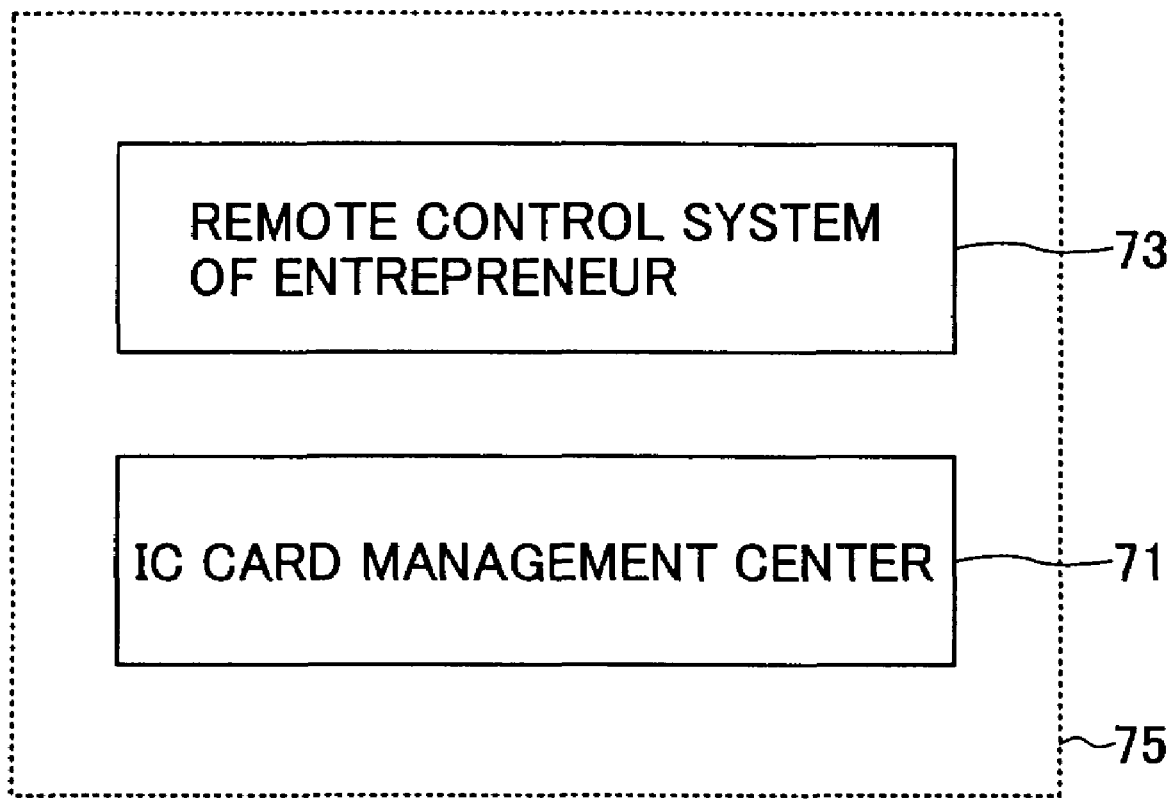
FIG. 7 is a diagram for explaining an example of a mobile device setting change center.

In FIG. 3, a process flow among the user of the mobile phone, the main part of the mobile phone, the SIM card and the IC card for settlement for the mobile phone, and a remote control system/an IC card management center of a mobile communication entrepreneur will be described. In addition, the remote control system of the mobile communication entrepreneur is a remote control system that remotely controls a switching device of the mobile communication entrepreneur and the setting of the mobile phone. The IC card management center is an IC card management center related to a credit company or a plurality of credit companies. As shown in FIG. 7, a mobile device setting center 75 can include both a remote control system 73 of the mobile communication entrepreneur and an IC card management center 71 together. Moreover, the remote control system 73 may include a function of the IC card management center 71. Furthermore, the IC card management center 71 may include the remote control system 73 of the remote communication entrepreneur.

First, the remote control system receives an application for changing the settings of the SIM card and the IC card for settlement and a setting of the main part of the mobile phone from the user, and confirms contents of setting change (ST1). When the contents indicate the setting change of the switching device 67, the remote control system instructs the setting change to the switching device 67 (ST2). In the switching device 67, the contents of the setting change are registered. For example, in a case in which use of a specific telephone number is prohibited, based on the instruction of the remote control system 73, the specific telephone number is registered so that the specific telephone number cannot be used (ST3).

Next, numbers and e-mail address of the SIM card, the IC card for settlement, and the main part of the mobile phone for which the setting change should be conducted are specified (ST4). If an owner of the mobile phone according to the SIM card, the IC card for settlement, and the main part of the mobile phone made a request to change the settings thereof, since the owner may apply the setting change by using the SIM card and the main part of the mobile phone, the numbers and the e-mail address are easily specified.

However, if the mobile phone is lost or stolen and the owner applies the setting change of the SIM card, the IC card for settlement, and the main part of the mobile phone from another mobile phone, it is not easy to specify the numbers and the e-mail address of the mobile phone. This case will be described with reference to FIG. 4 later. The explanation will be continued as assumed that the numbers and the e-mail address according to the SIM card, the IC card for settlement, and the main part of the mobile phone are specified.

Since the e-mail address is specified, the remote control system refers to an e-mail format database 63 and creates e-mail showing the setting change (ST5). As shown in FIG. 6C, the e-mail format includes setting change identification and an instruction part (setting change command statement).

Referring to FIG. 6C, "ME" denotes the main part of the mobile phone and "SIM" denotes the SIM card and the IC card for settlement. In FIG. 6C, when the setting change identification is "XXX1", the main part of the mobile phone is set to be invalid. When the setting change identification is "XXX2", the SIM card and the IC card for settlement are set to be invalid. When the setting change identification is "XXX3", the main part of the mobile phone, the SIM card and the IC card for settlement are set to be invalid.

Subsequently, the remote control system sends the setting change e-mail (ST6). It is determined in the mobile phone, which receives the setting change e-mail, whether or not there is the setting change identification in the setting change e-mail (ST7). When there is not setting change identification, it is determined as regular e-mail. Thus, e-mail is confirmed as usual (ST8).

On the other hand, when the e-mail includes the setting change identification, the e-mail is automatically opened (ST10). Even if the mobile phone is busy and the setting change is set with priority, this communication is compulsorily disconnected and the e-mail is opened (ST9).

E-mail is opened and the setting of the main part of the mobile phone, the SIM card, and the IC card for settlement are changed in accordance with the contents of e-mail (for example, the mobile phone, the SIM card, and the IC card for settlement are set so as not to be used) (ST11, ST12).

Figure 4:
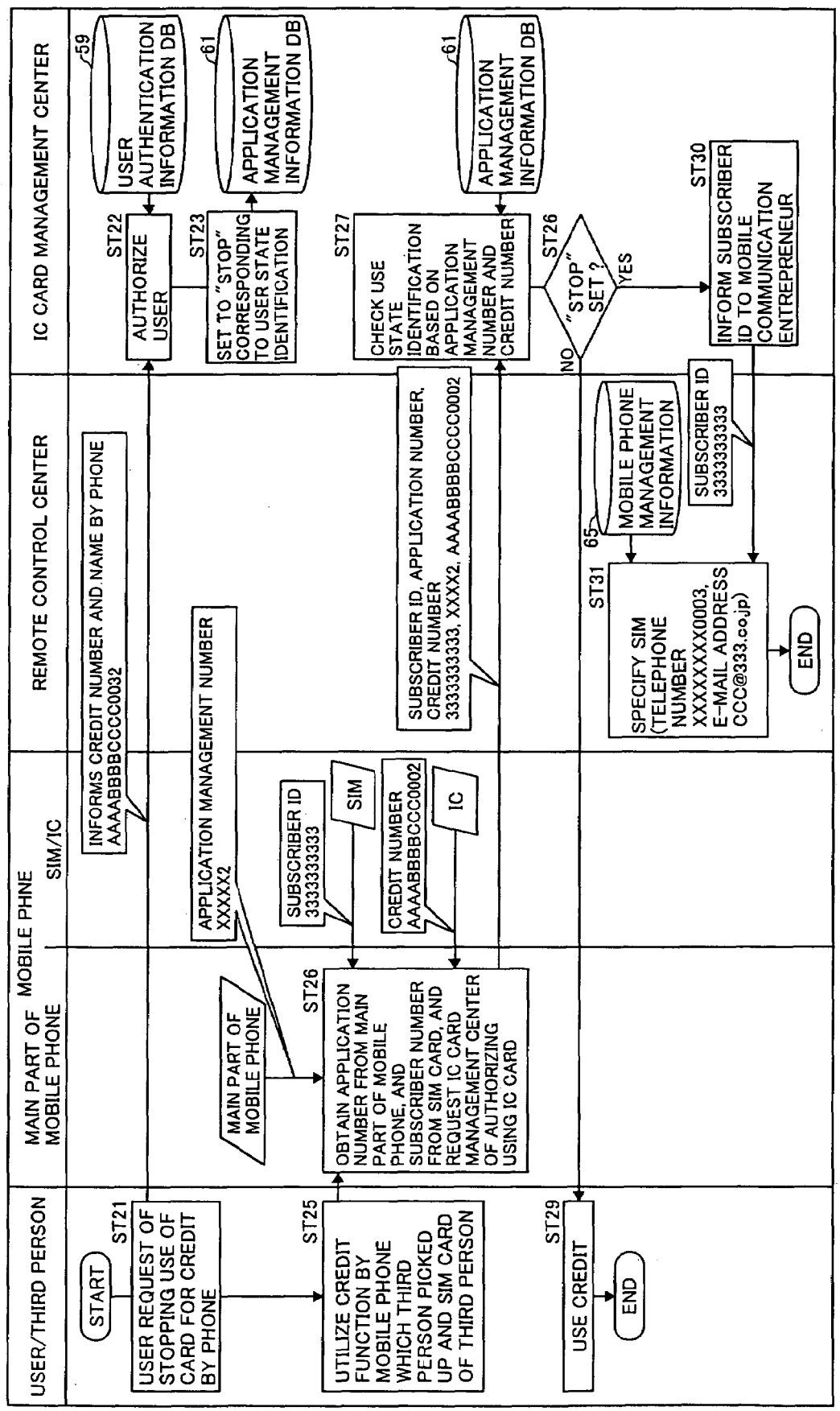
FIG. 4 is a diagram showing a process flow in a case in that the mobile phone mounting the IC card for settlement is lost or stolen and a third person makes a payment by using the IC card for settlement mounted to the mobile phone.

With reference to FIG. 4, a case, in which the mobile phone mounting the IC card for settlement is lost or stolen and a third person makes a payment by using the IC card for settlement mounted to the mobile phone, will be described.

FIG. 4 is a diagram showing a process flow among the user of the mobile phone, the main part of the mobile phone, the SIM card and the IC card for settlement for the mobile phone, and the remote control system/the IC card management center of the mobile communication entrepreneur.

First, the user of the mobile phone request of stopping use of the IC card for settlement by phone or a like (ST21). The user informs the credit number of the IC card for settlement (or maybe a customer number set by the IC card management center that manages IC card information of the IC card in a case in that the IC card for settlement is a multi-functional IC card and one of multiple functions allows the user to utilize credits of a plurality of credit companies) and a name of the user.

The IC card management center refers to a user authentication database 59 and authorizes the user (ST22). In the user authentication database 59, as shown in FIG. 6A, a credit number (customer number) is stored by corresponding to the name of the user.

Subsequently, use state identification of an application management information database 61 is set as "stop". In the application management information database 61, as shown in FIG. 6B, application management information is stored. "stop" is set to the use state identification of the application management number of the credit number (customer number) of the user whose the IC card is lost or stolen. For example, in FIG. 6B, the use state identification corresponding to "XXXXX2" is set to "stop".

After setting as described above, when the third person who picks up the mobile phone equips this mobile phone with a SIM card of the third person and utilizes the IC card for settlement of the mobile phone which the third person picked up (ST25), this mobile phone makes a request the IC card management center of authenticating using this IC card (ST26).

When this request of authenticating using this IC card is made, the application management number stored in the IC card for settlement mounted to the mobile phone (the mobile phone was picked up), the subscriber ID set to the SIM card (the SIM card of the third person), and the credit number (customer number) of the IC card for settlement (mounted to the mobile phone that was picked up) are sent to the IC card management center.

The IC card management center refers to the use state identification of the application management information database 61 based on the application management number and the credit number (customer number) (ST27). When the use state identification of the application management number is not set as "stop", it is allowed to use the IC card (ST29). On the other hand, when the use state identification of the application management number is set as "stop", instead of allowing to use the IC card, the subscriber ID is informed to the mobile communication entrepreneur (ST30). The mobile communication entrepreneur refers to a mobile phone management information database 65, and specifies the telephone number and the e-mail address of the mobile phone from the subscriber ID (ST31). In FIG. 6D, an example of the mobile phone management information database.

After that, the mobile communication entrepreneur conducts the process described above with reference to FIG. 4.

Figure 5:
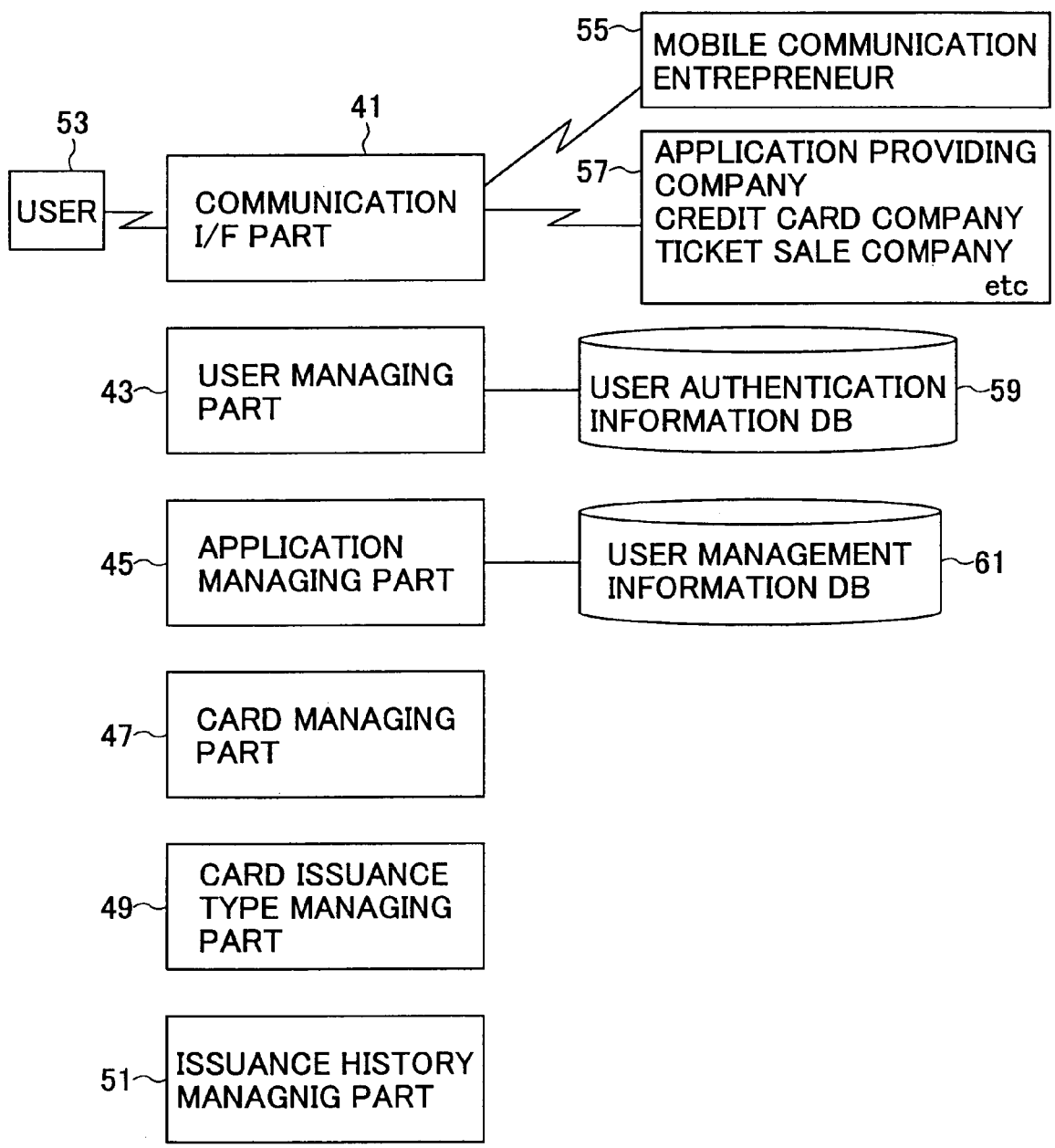
FIG. 5 is a diagram for explaining an example of a configuration of an IC card management center.

With reference to FIG. 5, an example of the IC card management center will be described. The IC card management center can be an IC card management center related to a single credit company or related to an IC card management center that manages IC card information related to a plurality of credit companies, and may tie up with an application providing company and a ticket sales company.

The IC card management center in FIG. 5 is an IC card management center that manages the IC card information related to the plurality of credit companies, and is the example of the IC card management center who ties up with the application providing company and the ticket sales company.

In FIG. 5, the IC card management center includes a communication interface part 41, a user managing part 43, an application managing part 45, a card managing part 47, a card issuance type managing part 49, and an issuance history managing part 51.

The communication interface part 41 is an interface for communication with a user 53, a mobile communication entrepreneur 55, companies 57 including the plurality of credit companies, the application providing company, the ticket sales company, and the like. The user managing part 43 manages information concerning the user. For example, the user managing part 43 manages registration of the user, and authorizes the user by referring to the user authentication information database 59. The application managing part 45 manages the application. For example, the application managing part 45 manages a version of the application, sets the use sate identification in the application management information database 61, and determines by referring to the application management information database 61 whether or not the IC card is available to use. The card managing part 47 manages information concerning an issuance of the IC card and contents of the issuance. The issuance history managing part 51 manages an issuance history for each IC card.

As described above, according to the embodiment of the present invention, in a case in which a person from whom the IC card used with the mobile phone is lost or stolen reports the IC card management center that the IC card of the person was lost or stolen, in addition to simply preventing from making a payment by the IC card, the setting of the mobile device is changed so that the IC card cannot be used. Therefore, a security of the IC card increases more.

Moreover, in a case in which the IC card that is lost or stolen is available to make payments for a plurality of companies and includes another function other than settlement, the user simply reports the IC card management center that the IC card is lost or stolen, so that the IC card is prohibited from being used. Therefore, a procedure for a loss or theft of the IC card can be simplified. Conventionally, the user is required to repot all companies relevant to the IC card. However, according to the embodiment of the present invention, the user simply reports the mobile device setting change center or the IC card management center.

As described above, according to the present invention, it becomes possible to suppress damages (damages by unauthorized use of the IC card) that may occur in a case in that the mobile device is lost, in advance.

Moreover, since it is possible to specify the telephone number and the like of the third person who tried to illegally utilize the SIM card or the IC card, a warning can be conducted and a penalty can be imposed to the third person.

Furthermore, in a case in which a payment is made by using the IC card being inserted into a lost or stolen mobile phone, by inserting the SIM card of the third person into the lost or stolen mobile phone, it is possible to specify the mobile phone that is lost or stolen.

The invention claimed is:

1. A method for preventing unauthorized use of an IC card, performed in an IC card management center that manages IC card information, comprising:

receiving a notice of a customer ID of an IC card from a person wherein the IC card for settlement is mounted to a mobile device of the person and the mobile device, which becomes available in a state of mounting an SIM card, is lost or stolen from the person;

giving an identification for stopping use of the IC card to an application management number of a database, which stores the application management number that is set for each mobile device by the IC card management center so as to be a number corresponding to the customer ID; and informing a subscriber ID to a mobile communication entrepreneur in order to warn and change a setting for the mobile device when the IC card for settlement is used by using the mobile device for which the identification is set to the application management number.

2. A program stored on a computer readable medium for causing a computer to prevent unauthorized use of an IC card, said computer being in an IC card management center that manages IC card information, said program comprising:

receiving a notice of a customer ID of a customer from whom a mobile device mounting the IC card for settlement is lost or stolen, wherein the mobile device becomes available in a state of mounting an SIM card;

giving an identification for stopping use of the IC card to an application management number of a database, which stores the application management number that is set for each mobile device by the IC card management center so as to be a number corresponding to the customer ID; and informing a subscriber ID to a mobile communication entrepreneur in order to warn and change a setting for the mobile device when the IC card for settlement is used, by using the mobile device for which the identification is set to the application management number.

* * * * *